UNITED STATES PATENT OFFICE.

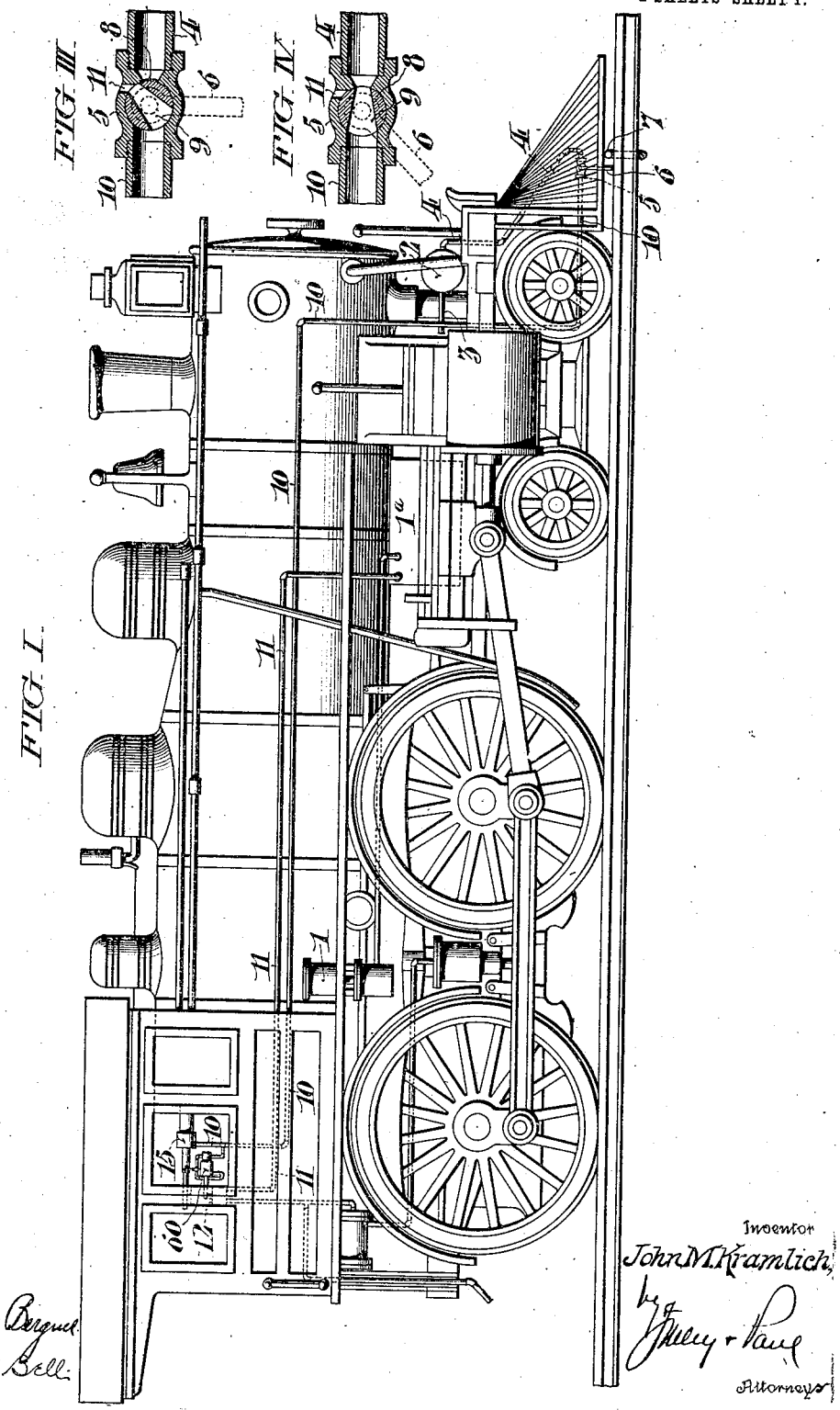

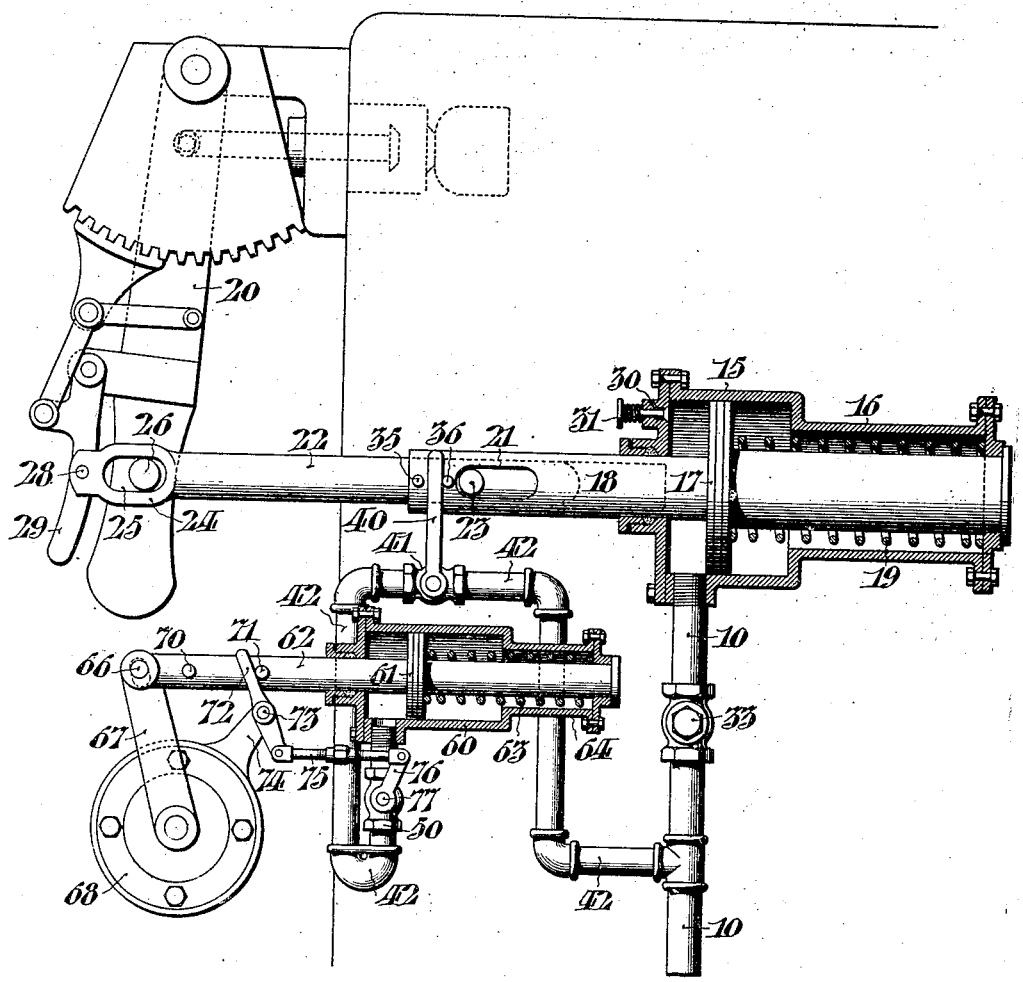

JOHN MORRIS KRAMLICH, OF PHILADELPHIA, PENNSYLVANIA, ASSIGNOR OF ONE-HALF TO JAY VICTOR HUGO KULP OF PHILADELPHIA, PENNSYLVANIA.

AUTOMATIC CONTROLLING DEVICE FOR LOCOMOTIVE-ENGINES.

1,055,761. Specification of Letters Patent. Patented Mar. 11, 1913.

Application filed January 11, 1910. Serial No. 537,395.

*To all whom it may concern:*

Be it known that I, JOHN M. KRAMLICH, of Philadelphia, in the county of Philadelphia and State of Pennsylvania, have invented certain new and useful Improvements in Automatic Controlling Devices for Locomotive-Engines, whereof the following is a specification, reference being had to the accompanying drawings.

My invention has reference to that class of devices in which a tripping member is connected with the switch and signaling system in such manner that when the signal at that point is set for stoppage of a train, the tripping element shall be protruded into its operative position, so as to be struck by a controlling member carried by a passing locomotive, but when the signal is set to permit passage of the train, the tripping element is withdrawn out of range of the member carried by the locomotive.

The features of improvement, which characterize my invention relate to the organization of the controlling devices carried by the locomotive, and the purpose thereof is to overcome certain objections heretofore found in devices intended for a similar result.

In the accompanying drawings, Figure I, represents a view in side elevation indicating the main features of a locomotive engine to which the organization characteristic of my invention is applied, the purpose of this view being to show comprehensively the location of the various parts of the system, without minuteness of detail. Fig. II, is a view partly in side elevation, and partly in vertical section, of the details of the pneumatic cylinders and their pistons which constitute the controlling devices for the throttle valve of the locomotive, and for the valve of the automatic air brake system. In said figure, the representation of the throttle lever and its adjuncts, as well as of the actuating lever of the air brake valve, is diagrammatic, as will be hereafter explained. Figs. III, and IV, represent in vertical section the details of the valve which is directly actuated by the tripping device, the position of the valve in Fig. III, being the normal one, and the position in Fig. IV, being that which occurs upon the tripping action.

Referring now to the general view of Fig. I, it is unnecessary to describe any of the well known parts of the locomotive therein represented, it being sufficient to state that said locomotive is provided with the ordinary throttle valve and lever, and also with the usual elements of an air brake system including an operating lever for the air brake valve.

For present purposes the description of the essential parts of the invention may commence with the air pump 1, which supplies the air brake system. I prefer to employ a separate pressure reservoir 2, for operating the controlling devices, said reservoir being conveniently located as shown, above the cow-catcher, and directly communicating with the pump reservoir 1ª, by means of a pipe 3, only a portion of which is shown. From said reservoir 2, a pipe 4, leads down to a region near the level of the track, and is protected by the cow-catcher from contact with abnormal obstructions. A valve, whose casing is indicated at 5, is arranged in said pipe, and provided with a depending lever 6, which, when in a vertical position, maintains the valve within the casing 5, in a closed condition. Said lever 6, is located in a position which permits it in passing to strike against and be shifted by an external tripping member 7, (arranged adjacent to the track, and connected with the switch and signaling mechanism) when said member 7, is protruded in correspondence with the setting of signal for stoppage of the train.

When the lever 6, strikes against the member 7, in the act of passage, said lever 6, is thrown rearwardly at an angle of about 45 degrees to the vertical, as indicated by the dotted lines in Fig. IV, and thereupon, shifts the valve into an open position. When however, said member 7, is withdrawn from such operative position, in correspondence with the setting of a signal for passage of the train, the lever 6, passes without contact.

Referring to Figs. III, and IV, the details of the valve are shown and are as follows:—The pipe 4, leads into the front end of the valve chest 5, in which is located the rotary valve 8, whose port 9, is tapered, as shown, and so arranged as to cut off communication between the pipe 4, and the rearwardly extending pipe 10, when the lever 6, is vertical, said port 9, however in this position communicating with the exhaust opening 11. When, however, the lever 6, has been shifted by contact with the tripping lever 7, into the position shown in Fig. IV, the port 9, opens communication between the pipes 4, and 10, thus permitting the access of air under pressure from the reservoir 2, to the pipe 10. Said pipe 10, extends rearwardly for a short distance and is then preferably carried upward, as shown, to a point near the front end of the locomotive boiler, whence it extends rearwardly to a point within the cab, where it is provided with a check valve 33, opening upward, and is then connected with a pressure cylinder 15, which I term the main pressure cylinder. A pipe 11, leads from the main pressure tank 1ª, rearwardly to a point within the cab, and is there connected with the valve chamber 68, of the automatic brake system. This valve chamber and its controlling valve is preferably a duplicate of the ordinary air brake controlling device, adapted for manual actuation by the engineer.

The two elements intended to be automatically controlled and operatively shifted by means of my device, are in the first instance, the throttle valve of the locomotive, and in the second instance, the valve of the air-brake system.

Referring now to Fig. II, the details of the main operative elements of the system will be explained. As before stated, Fig. II, is partly diagrammatic, in that the throttle valve 20, and actuating lever 67, of the automatic brake valve are shown at right angles to their true positions. Ordinarily, for convenience of location, and economy of space, both of said levers move in a horizontal plane. For simplicity of illustration in Fig. II, they are represented as though moving in a vertical plane, but it will be readily understood, from the explanation of the actuating devices about to be given, that said devices are capable of operating the throttle lever and the brake valve, irrespective of the plane in which said levers move. The main pressure cylinder 15, into which the pipe 10, (before described), leads, is provided with a piston 17, attached to a tubular piston rod 18. A spring 19, located within a rearward extension 16, of the cylinder 15, normally tends to maintain said piston in what may be called the neutral position shown in Fig. II. The front portion of said hollow piston rod 18, is provided with an elongated slot 21, and carries a telescoping piston rod 22, having a stud 23, which is located within the slot 21, so as to permit lost motion between the telescoping parts to the extent of the length of the slot, but to cause operative engagement between said parts when the limit of the slot has been reached in either direction. The front end of the rod 22, is provided with a yoke 24, having an elongated slot 25, in which is located a stud 26, mounted upon the throttle lever 20. Lost motion between said yoke and said throttle lever is permitted to the extent of the length of the slot 25, but operative engagement is obtained when the limit of the slot has been reached in either direction. A pin 28, mounted in the extremity of the yoke 24, is pivotally connected with the grip lever 29, of the throttle lever. It will thus be seen that the organization of the telescoping piston rod device and its adjuncts is such that manual operation of the throttle lever is permitted by reason of the capacity for lost motion due to the presence of the slots 23, and 25, and furthermore that when the piston rod 22, moves to the right in Fig. II, the first effect of such motion is to actuate the grip lever 29, thus freeing the throttle lever, but that the actuation of the throttle lever itself, by the further movement of the piston rod, is direct. This provision for a direct connection between the throttle lever and the actuating mechanism is much more efficient and permanent than where an attempt is made to actuate the throttle lever by connecting the actuating mechanism with the grip lever, as has heretofore been suggested.

The operation of the parts just described is as follows:—When the lever 6, is struck by the tripping member 7, and air under pressure is admitted to the pipe 10, the piston 17, is forced toward the rear end of the main cylinder 15, (or to the right in Fig. II), and since the stud 23, is then at the left hand extremity of the slot 21, immediate movement of the rod 22, takes place. The lost motion of the stud 26, in the slot 25, permits the actuation of the grip lever 29, by means of the pin 28, before operative contact has been made between the stud 26, and the left hand end of the slot 25. Hence, although the throttle lever 20, is free to move, it is not shifted through the medium of the grip lever, but is actuated directly by the pull of the piston rod 22, upon the stud 26. Movement of the throttle lever in this direction shuts off the steam and thereupon the engine ceases to be positively propelled.

Disregarding for the moment the connections with the air brake system, which are preferably provided to insure application of the air brakes simultaneously with the shutting off of the steam, the remaining devices to be noted in connection with the organization just described are as follows:—A bleeding orifice 30, having a plug 31, adapted to be manually controlled, is located in the head of the main cylinder 15. Hence when the lever 6, has been reset into its normal or perpendicular position, so as to cut off the supply of air under pressure through pipe 10, the engineer can by opening the bleeding orifice, allow the air to escape, whereupon the spring 19, returns the piston 17, to its neutral position. It will be noted that there is no connection between the lever 6, and the cab, so that the resetting of said lever can only be effected by a person outside of the cab. Hence, the engineer cannot simply re-set the parts without dismounting and thus continue the travel of the locomotive without interruption.

I will now proceed to describe the organization whereby the proper application of the air brakes is attained in correspondence with the actuation of the throttle lever. Near the front end of the hollow piston rod 18, I provide two studs 35, and 36, respectively, between which is located the upper end of the lever 40, connected with a valve located within the valve chest 41, and controlling the communication through the pipe 42, which branches off, as shown, from the pipe 10, at a point below the check valve 33. When the parts are in what may be called the normal or neutral position, the lever 40 is vertical, and communication through the pipe 42, is shut off, but when the piston 17, is moved to the right, the lever 40, is turned so as to open the communication through the pipe 42, with the interior of the secondary pressure cylinder 60, having a piston 61, and piston rod 62, said piston being provided with a spring 63, located in a rearward extension 64, of the cylinder and tending to normally restore the piston to its neutral position as shown in Fig. II. The front end of the piston rod 62, is pivotally connected at 66, with the controlling lever 67, of the air brake valve whose chest is indicated at 68. Adjacent to the front end of the piston rod 62, are two studs 70, and 71, respectively, between which is located the upper extremity of a lever 72, pivotally mounted at 73, upon a bracket 74, conventionally indicated as extending from the valve chest 68, it being understood, however, that owing to the diagrammatic nature of the representation the actual position of the valve chest is at right angles to that indicated. Said lever 72, is connected by means of a rod 75, with a lever 76, which is attached to a stem 77, of a rotary valve within the casing 50, located in the pipe 42. The details of said valve are similar to those of the valve shown in Figs. III, and IV. That is to say, in the normal position of the valve, (corresponding with the neutral position of the piston 61) communication through the pipe 42, to the interior of the cylinder 60, is established, but in the other position of the valve, (which will presently be described), such communication is cut off, and communication is opened between the cylinder 60, and the exhaust port of the valve at 50.

The method of operation of the device just described is as follows: The several parts shown in Fig. II are in the normal or running position, but when in consequence of the admission of air through the pipe 10, the piston 17, of the main cylinder 15, is moved to the right, thereby permanently closing the throttle valve, an engagement of the stud 35, with the lever 40, opens communication with the source of pressure through the pipe 42, and since the valve at 50, is normally open, the air under pressure enters the secondary cylinder 60, and throws the piston to the right in Fig. II. This movement of the piston actuates the lever 67, of the air brake system so as to cause the application of the air brakes by allowing a small reduction in the train line. The same movement, however, of the piston rod 62, which has effected this result, throws the stud 70 into contact with the lever 72, and the continued movement of the piston rod shifts the lever 72, so as to shut off communication with the source of pressure, and to open communication between the interior of the secondary cylinder 60, and the exhaust port of the valve at 50. Hence the air being free to escape slowly through a small bleed hole in the valve 50 such as shown in Fig. III, under the pressure of the spring 63, which is of slow expansion and restores the piston 61, to its previous position, thus shifting the lever 67 slowly to its normal position, and thereby cutting off the supply of air to the brakes as ordinarily accomplished manually. The valve 68 which is connected to the brake system, may be of any convenient construction, such as ordinarily employed for the purpose. It will, of course, be understood that the method of applying the brakes according to my invention, is the same as commonly used, i. e., the release of the air from the system, causing the application of the brakes. The movement of the piston rod 62, which effects this result, brings the stud 71, into contact with the lever 72, and shifts said lever back into the position shown in Fig. II, which with valve as in Fig. IV corresponds with the position of communication between the source of pressure and the interior of the secondary cylinder 60, so that air under pressure is again admitted to said cylinder and the piston 61, is again shifted to the right. This movement, however, results in a repetition of the shifting of the lever 72, by the stud 70, which again shuts off the air under pressure and opens the exhaust port 11 Fig. III of the valve at 50, so that the piston 61, is again restored to its normal position. Hence, so long as the piston 17, of the throttle valve system is in a position which corresponds with the open position of the valve at 41, a series of operations releasing the air in the train line, will apply the brakes with each separate release of the air out of the train line and the air brakes are applied so that the train is gradually brought to a stop in manner practiced by skilful engineers. This method of applying the air brakes obviates the dangers heretofore experienced in devices intended to automatically apply the air brakes, once for all and in a sudden manner, which operation is destructive and may be dangerous, the application being characterized by all the disadvantages which should only be risked in the case of great emergency, where a sudden stop is required. Such application of the air brakes is, however, not necessary for the efficient and gradual stoppage of a train within a reasonable distance of the signaling point.

Having thus described my invention, I desire to state that I am aware that it is not broadly new to provide means for stopping a locomotive by contact of controlling mechanism, carried thereon, with an external tripping element connected with the signaling mechanism of the railroad, and I am also aware that such devices have been employed to actuate not only the throttle lever of a locomotive, but also to apply the air brakes. Hence I do not broadly claim such devices. I believe, however, that the feature of improvement above described, whereby intermittent and repeated applications of the air brakes, and consequent gradual stoppage of the train, are effected, is broadly new in this class of devices, and in certain of my claims hereafter made I desire to claim such feature without limitation to the precise details of the mechanism which I have shown for that purpose, and which may of course be varied by the exercise of mechanical skill. Furthermore, while I have described the invention as applied to a steam locomotive, I do not thereby mean that in its broader aspect it is limited to such application, but contemplate its use for any locomotive engine which is provided with a supply of motive power and with a brake system.

I claim:—

1. In a locomotive engine provided with a member controlling the supply of motive power, a brake system, and a controlling member for said brake system, the combination, with actuating mechanism; of primary means for shifting the member which controls the motive power, such means being operatively connected with said actuating mechanism; secondary means for shifting the member which controls the brake system, said secondary means being operatively connected with said actuating mechanism; and means for repeatedly and intermittently shifting said brake controlling member to gradually apply the brakes upon the shifting of said primary means to shut off the motive power, substantially as set forth.

2. In a steam locomotive provided with a throttle valve lever, an air brake system and a controlling member for said air brake system; the combination, with a source of supply of fluid under pressure; and a controlling valve therefor; of a main pressure cylinder; a piston and piston rod therefor, said piston rod being operatively connected with said throttle lever; a secondary cylinder; a piston and piston rod therefor, said last mentioned piston rod being operatively connected with the controlling member of the air brake system; and means for repeatedly and intermittently admitting said fluid to said secondary cylinder and discharging it therefrom upon the occurrence of operative movement of the piston in the main cylinder.

3. In a steam locomotive provided with a throttle valve lever and a grip lever therefor, an air brake system, and a controlling member for said air brake system; the combination, with a source of supply of fluid under pressure, and a controlling valve therefor; of a pressure cylinder; a piston and piston rod therefor; means for directly engaging said piston rod with the throttle valve lever while permitting a limited degree of lost motion prior to such engagement; and independent means for positively connecting said piston rod to the grip lever of the throttle valve lever, without lost motion.

4. In a steam locomotive provided with a throttle valve lever, an air brake system, and a controlling member for said air brake system; the combination, with a source of supply of fluid under pressure, and a controlling valve therefor; of a pressure cylinder; a piston therein; a compound piston rod, comprising parts telescoping with respect to one another through a limited range of lost motion, but positively engaging one another in either direction at the limits of said range; and means for operatively connecting one of said telescoping parts with the throttle valve lever.

5. In a steam locomotive provided with a throttle valve lever, an air brake system, and a controlling member for said air brake system; the combination, with a source of supply of fluid under pressure, and a controlling valve therefor; of a main pressure cylinder; a piston and piston rod therefor, said piston rod being operatively connected with the throttle lever; a secondary cylinder; a piston and piston rod therefor, said last mentioned piston rod being connected with the controlling member of the air brake system; a valve controlling the admission of said fluid under pressure to said secondary cylinder; actuating mechanism for said valve, operatively connected with the piston rod of the primary cylinder; a supplemental valve controlling the admission of said fluid to said secondary cylinder and also adapted to permit the exhaust of fluid therefrom; means for actuating said supplemental valve by the movement of the piston rod of said secondary cylinder, whereby after the movement of said piston rod in the direction corresponding with application of the air brakes, the supply of fluid is cut off from said secondary cylinder and communication is established between the interior thereof and the exhaust opening; means for automatically returning the piston of said secondary cylinder to a neutral position upon the discharge of said fluid through the exhaust; and means for actuating said supplemental valve to close the exhaust and readmit said fluid to the interior of said secondary cylinder on the movement of the piston to its neutral position.

In testimony whereof, I have hereunto signed my name, at Philadelphia, Pennsylvania, this fifth day of January, 1910.

JOHN MORRIS KRAMLICH.

Witnesses:
　JAMES H. BELL,
　E. L. FULLERTON.